United States Patent [19]

Cantanese

[11] Patent Number: 5,033,920
[45] Date of Patent: Jul. 23, 1991

[54] DRILL CHUCK LOCK APPARATUS

[76] Inventor: Tony Cantanese, 51 McQuade's La., Northbridge, Mass. 01534

[21] Appl. No.: 533,015

[22] Filed: Jun. 4, 1990

[51] Int. Cl.$^5$ ............................................. B23B 31/08
[52] U.S. Cl. .................................. 408/239 R; 279/97
[58] Field of Search ................... 408/226, 238, 239 R; 279/19.5, 86, 97

[56] References Cited

U.S. PATENT DOCUMENTS

| 771,626 | 10/1904 | Gilman | 279/97 |
|---|---|---|---|
| 1,182,934 | 5/1916 | Scott | 279/19.5 |
| 1,833,236 | 11/1931 | Smith | 279/97 |
| 2,974,965 | 3/1961 | Welles, Jr. | 408/226 |
| 2,985,899 | 5/1961 | Elliott | 408/226 |
| 3,091,044 | 5/1963 | Penote et al. | 279/97 |
| 3,726,533 | 4/1973 | Lafferty, Sr. | 279/97 |
| 4,284,284 | 8/1981 | Sides | 408/239 R |
| 4,809,995 | 3/1989 | Ramunas | 279/1 B |

Primary Examiner—William Briggs
Attorney, Agent, or Firm—Leon Gilden

[57] ABSTRACT

An apparatus to selectively secure a drill chuck, wherein the drill bit is formed with a rear and forward hexagonal portion coaxially aligned with a circumferential groove positioned between the forward and rear sections, whereupon a hexagonal bore formed within an associated drill chuck receives the forward and rear sections. A lock pin is slidably mounted through the drill chuck orthogonally relative to an axis of the drill chuck and spaced above an axis of the drill chuck to permit engagement of the drill bit member within the drill chuck when a lock pin is in a forward position and disengagement of the groove of the drill bit in a lock pin is in a retracted second position.

3 Claims, 3 Drawing Sheets

FIG. 1
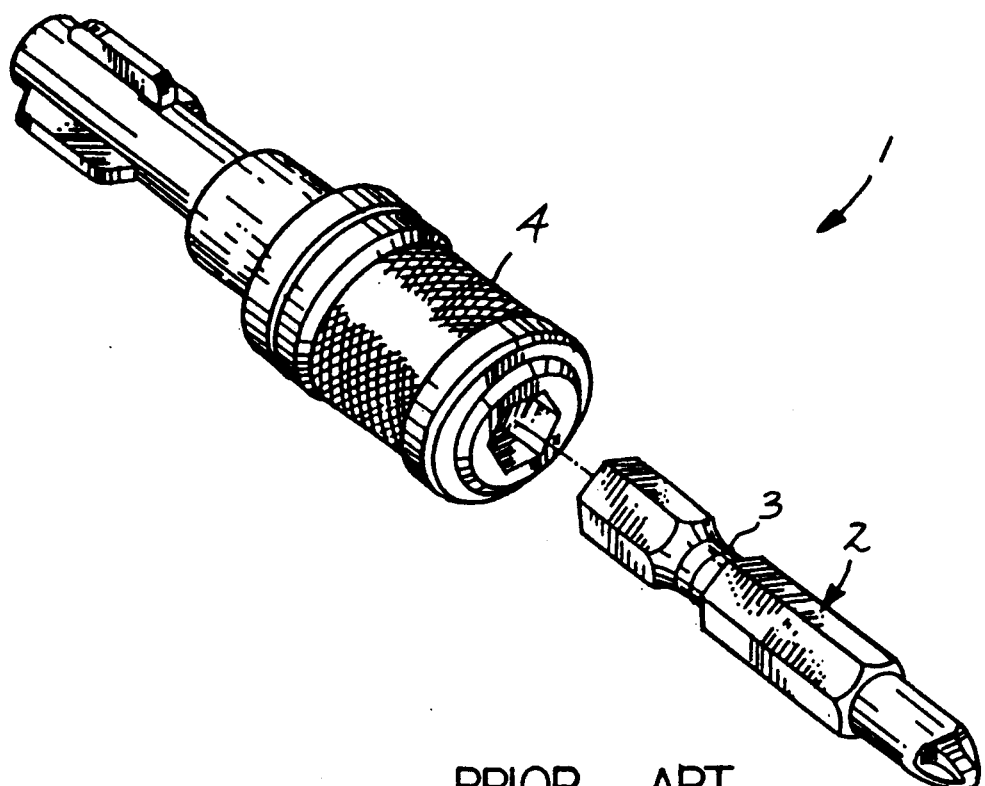
PRIOR ART
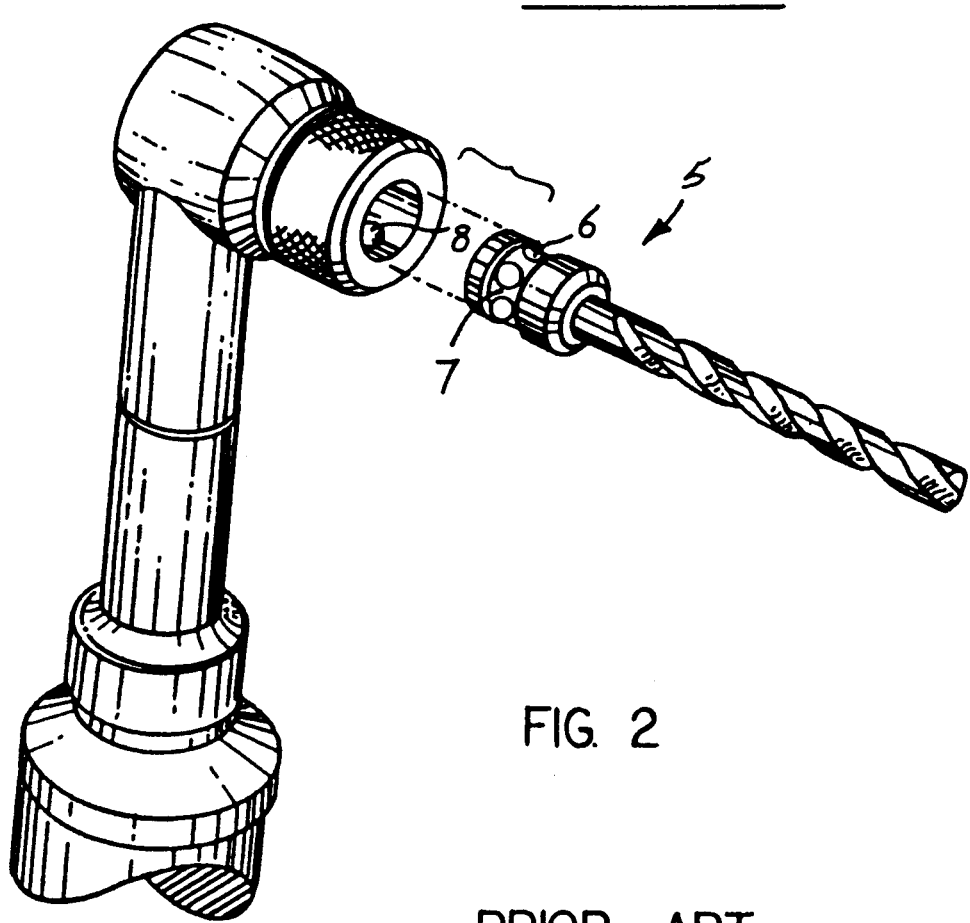
FIG. 2
PRIOR ART

DRILL CHUCK LOCK APPARATUS

BACKGROUND OF THE INVENTION

1. Field of the Invention

The field of invention relates to drill chuck apparatus, and more particularly pertains to a new and improved drill chuck lock apparatus wherein the same permits selective locking and engagement of a drill bit to permit securement of the drill bit for use by an associated drill apparatus.

2. Description of the Prior Art

The use of power bits are utilized in the prior art, wherein the power bits are generally formed with a hexagonally configured shank and a groove disposed about the shank. Power bits are conventionally utilized with electric and air-driven tools and wherein the use of such power bits are of a quick release and securement within an associated chuck apparatus. The power bits of the prior art have typically utilized a generally flat bottom groove floor, as opposed to the instant invention, including a groove of a semi-cylindrical cross-sectional configuration to cooperate with an arcuate lock pin slidably mounted within the chuck.

Prior art structure for use with such power bit apparatus may be found in U.S. Pat. No. 4,692,073 to Martindell wherein the power bit is receivable within a hexagonal bore of the drill chuck, wherein a spring-biased sleeve directs a locking ball to be received within the groove of the power bit.

U.S. Pat. No. 4,749,316 to Hendricks utilizes a power bit type tool, wherein a fluid coupler is arranged to secure the power bit within the drill chuck apparatus.

U.S. Pat. No. 4,717,292 to Phillips sets forth the use of a drill, including flat surfaces to be engaged and received within a complementarily configured drill chuck.

U.S. Pat. No. 4,809,995 to Ramunas sets forth a quick-change mechanism for use with a collett utilizing an eccentric displaceable body and reciprocatable rod to engage a drill member within the chuck.

U.S. Pat. No. 4,234,277 to Benson, et al. utilizes a quick-change drill bit including a groove formed with a series of semi-spherical recesses to receive a locking ball detent mounted within the drill chuck of the organization.

As such, it may be appreciated that there continues to be a need for a new and improved drill chuck lock apparatus wherein the same addresses both the problems of ease of use, as well as effectiveness in construction in providing a quick-change locking arrangement in association with a drill chuck and as such, the present invention substantially fulfills this need.

SUMMARY OF THE INVENTION

In view of the foregoing disadvantages inherent in the known types of drill chuck apparatus now present in the prior art, the present invention provides a drill chuck lock apparatus. As such, the general purpose of the present invention, which will be described subsequently in greater detail, is to provide a new and improved drill chuck lock apparatus which has all the advantages of the prior art drill chuck apparatus and none of the disadvantages.

To attain this, the present invention provides an apparatus to selectively secure a drill chuck, wherein the drill bit is formed with a rear and forward hexagonal portion coaxially aligned with a circumferential groove positioned between the forward and rear sections, whereupon a hexagonal bore formed within an associated drill chuck receives the forward and rear sections. A lock pin is slidably mounted through the drill chuck orthogonally relative to an axis of the drill chuck and spaced above an axis of the drill chuck to permit engagement of the drill bit member within the drill chuck when a lock pin is in a forward position and disengagement of the groove of the drill bit in a lock pin is in a retracted second position.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved drill chuck lock apparatus which has all the advantages of the prior art drill chuck apparatus and none of the disadvantages.

It is another object of the present invention to provide a new and improved drill chuck lock apparatus which may be easily and efficiently manufactured and marketed.

It is a further object of the present invention to provide a new and improved drill chuck lock apparatus which is of a durable and reliable construction.

An even further object of the present invention is to provide a new and improved drill chuck lock apparatus which is susceptible of a low cost of manufacture with regard to both materials and labor, and which accordingly is then susceptible of low prices of sale to the consuming public, thereby making such drill chuck lock apparatus economically available to the buying public.

Still yet another object of the present invention is to provide a new and improved drill chuck lock apparatus which provides in the apparatuses and methods of the prior art some of the advantages thereof, while simultaneously overcoming some of the disadvantages normally associated therewith.

Still another object of the present invention is to provide a new and improved drill chuck lock apparatus wherein the same utilizes a sliding lock pin tangentially mounted relative to an arcuate groove formed within a quick-change drill bit to selectively secure the drill bit within an associated drill chuck.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a prior art quick-change drill bit structure.

FIG. 2 is an isometric illustration of a further example of a prior art quick-change drill bit structure.

DESCRIPTION OF THE PREFERRED EMBODIMENT

Figure 3:
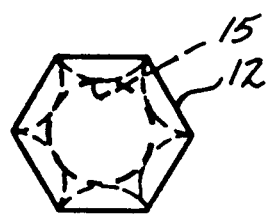
FIG. 3 is a top orthographic view of the drill bit utilized by the instant invention.

With reference now to the drawings, and in particular to FIGS. 1 to 7 thereof, a new and improved drill chuck lock apparatus embodying the principles and concepts of the present invention and generally designated by the reference numeral 10 will be described.

FIG. 1 illustrates a prior art locking chuck organization 1, wherein a drill bit 2 includes a groove, including a planar floor 3, with a generally hexagonal shank receivable within a hexagonal bore within the socket 4 for securement therewithin by a detent ball, in a manner as set forth in U.S. Pat. No. 4,692,073. FIG. 2 illustrates a further prior art device 5, wherein the drill bit includes a groove 7, including a series of spherical recesses 6 cooperating with a detent ball 8 to secure the drill bit within the chuck socket, in a manner as set forth in U.S. Pat. No. 4,234,277.

Figure 4:
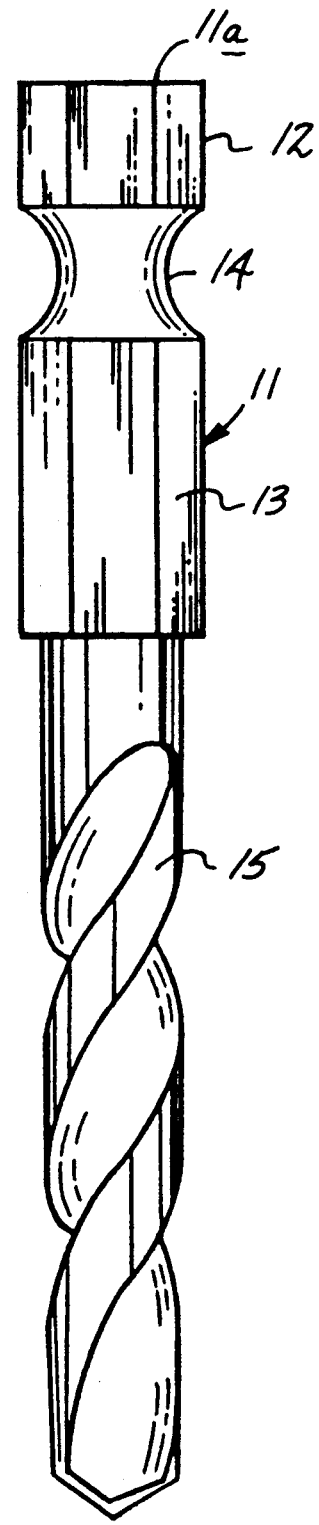
FIG. 4 is an orthographic side view, taken in elevation, of the drill bit utilized by the instant invention.

More specifically, the drill chuck lock apparatus 10 of the instant invention essentially comprises a power bit 11 defined by a configuration, including a hexagonal shank defined by a hexagonal rear shank 12 coaxially aligned with a hexagonal forward shank 13, with the "flats" of each of the rear and forward shanks 12 and 13 respectively aligned with rear and forward "flats", in a manner as illustrated in FIGS. 3 and 4 for example. A circumferential arcuate groove 14 is formed between the rear and forward shanks defined by a semi-circular cross-sectional configuration. A drill member 15 is orthogonally and longitudinally mounted in coaxial alignment with the forward shank 13, as illustrated in FIG. 4. Further, the rear hexagonal shank is defined by a first length defining an axial length of the rear shank and from a rear end surface 11a of the rear shank, wherein the circumferential arcuate groove 14 is defined by a second length measured between the rear shank 12 and the forward shank 13, and wherein the forward shank 13 is defined by a third length measured from the arcuate groove 14 to the drill member 15.

Figure 5:
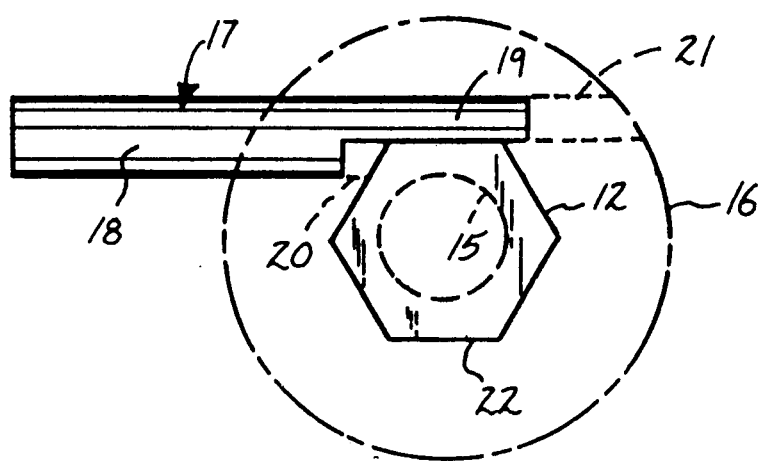
FIG. 5 is an orthographic top view of the lock pin in association with the drill chuck of the instant invention in an unlocked first position.
Figure 6:
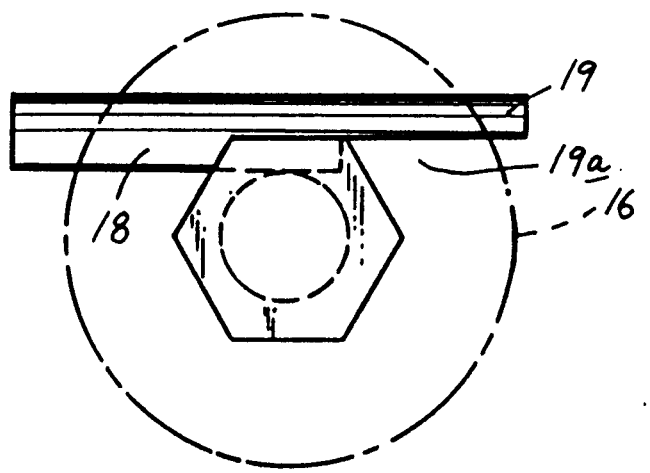
FIG. 6 is an orthographic top view of the drill bit in association with the drill chuck of the instant invention, with a lock pin in a second locked position.
Figure 7:
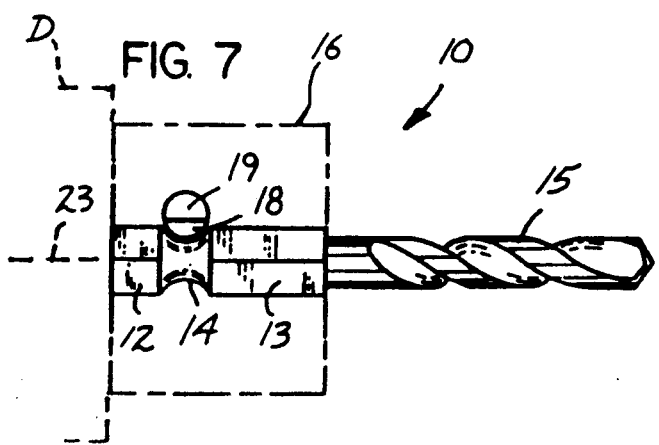
FIG. 7 is an orthographic side view of the drill chuck in operative association with the drill bit of the instant invention.

Reference to FIGS. 5, 6, and 7 illustrate the use of a drill chuck 16 cooperating with the drill member "D" of a conventional construction, utilizing either electric or pneumatic power for its operation, wherein the drill chuck 16 includes a hexagonal socket 22 of a complementary configuration to that defined by the rear and forward shanks to complementarily receive the rear and forward shanks therewithin, and wherein the drill chuck 16 is defined by a drill chuck length substantially equal to the cumulative sum of the first, second, and third lengths as noted above. The drill chuck 16 includes a lock pin 17 slidably mounted therewithin, wherein the lock pin 17 is slidably mounted in an orientation orthogonally relative to a drill chuck axis 23 and positioned in a spaced relationship relative to the axis 23. The lock pin 17 includes a cylindrical body 18 and semi-cylindrical leg 19 projecting longitudinally and forwardly of the cylindrical body to define a lock pin recess 19a, also of a semi-cylindrical configuration complementary to that defined to the semi-cylindrical leg 19. With the lock pin cylindrical body 18 slidably receivable within a first bore and the first bore 20 in communication with a second bore 21, wherein the first and second bores are of a complementary configuration to the cylindrical body 18 and the semi-cylindrical leg 19 respectively. The first bore 20 extends tangentially relative to the circumferential arcuate groove 14 when received within the hexagonal socket 22 to permit the cylindrical body 18 to be received within the arcuate groove 14 when the lock pin is in a forward second position, as opposed to a retracted first position, as illustrated in FIG. 5, to permit removal of the power bit 11 when the semi-cylindrical leg 19 is positioned overlying the arcuate groove. As illustrated, the cylindrical body 18, when positioned within the cylindrical groove, prevents extraction of the power bit 11, in a manner as illustrated in FIGS. 6 and 7.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A drill chuck lock apparatus comprising, in combination, a power bit, wherein the power bit includes a hexagonal rear shank, and a coaxially aligned hexagonal forward shank, with a circumferential arcuate groove formed in the power bit between the rear shank and the forward shank, and a drill member directed forwardly of the forward shank, wherein the rear shank, the forward shank, the arcuate groove, and the drill member are all coaxially aligned relative to one another, and a drill chuck formed about a drill chuck axis, wherein the drill chuck includes a lock pin member reciprocatably mounted through the drill chuck orthogonally oriented relative to the drill chuck axis, the drill chuck including a hexagonal socket defined by a socket cross-sectional configuration complementary to that defined by the rear shank and forward shank to complementarily receive the rear shank and forward shank therewithin, wherein the lock pin member is receivable within the arcuate groove when the rear shank and forward shank are positioned within the drill chuck and wherein the rear shank is defined by a first length, the arcuate groove defined by a second length, and the forward shank defined by a third length, wherein the drill chuck is defined by a drill chuck length substantially equal to the first length plus the second length plus the third length.

2. An apparatus as set forth in claim 1 wherein the lock pin member includes a cylindrical body and a semi-cylindrical leg extending longitudinally and forwardly of the cylindrical body, wherein the cylindrical body is slidably receivable within a first bore, the first bore extending orthogonally and coaxially displaced relative to the drill chuck axis to overlie the arcuate groove when the rear shank and forward shank are positioned within the drill chuck, and a second bore aligned with the semi-cylindrical leg to extend beyond the first bore through the drill chuck, and the lock pin member slidable from a first position, wherein the cylindrical body is in a first position spaced from the arcuate groove, with the semi-cylindrical leg positioned to overlie the arcuate groove, and the lock pin member slidable to a second position with the cylindrical body positioned to overlie the arcuate groove.

3. An apparatus as set forth in claim 2 wherein the first bore is spaced from a forward end of the drill chuck a distance substantially equal to the third length and spaced from a rear surface of the drill chuck a distance substantially equal to the first length.

* * * * *

UNITED STATES PATENT AND TRADEMARK OFFICE
CERTIFICATE OF CORRECTION

PATENT NO. : 5,033,920

DATED : July 23, 1991

INVENTOR(S) : Cantanese

It is certified that error appears in the above-identified patent and that said Letters Patent is hereby corrected as shown below:

On the title page, under Item [19], "Cantanese" should be
-- Catanese--.

On the title page, Item[76], "Tony Cantanese" should be
-- Tony Catanese--.

Signed and Sealed this

Twenty-ninth Day of December, 1992

*Attest:*

DOUGLAS B. COMER

*Attesting Officer*  *Acting Commissioner of Patents and Trademarks*